(12) United States Patent
Rehm et al.

(10) Patent No.: US 7,627,440 B2
(45) Date of Patent: Dec. 1, 2009

(54) INERTIA AND LOAD TORQUE ESTIMATING METHOD AND APPARATUS

(75) Inventors: Thomas J. Rehm, Mequon, WI (US); Peter B. Schmidt, Franklin, WI (US); John Joseph Golownia, Jr., Hartford, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 136 days.

(21) Appl. No.: 11/846,159

(22) Filed: Aug. 28, 2007

(65) Prior Publication Data
US 2009/0063058 A1 Mar. 5, 2009

(51) Int. Cl.
*G06F 19/00* (2006.01)
*G01P 15/00* (2006.01)
*G05B 9/00* (2006.01)

(52) U.S. Cl. .................. 702/41; 702/141; 318/563
(58) Field of Classification Search ........ 702/41, 702/141, 142, 145; 318/563, 624, 626, 632
See application file for complete search history.

(56) References Cited

U.S. PATENT DOCUMENTS

| | | |
|---|---|---|
| 5,091,684 A | 2/1992 | Iwashita |
| 5,285,378 A | 2/1994 | Matsumoto |
| 5,495,158 A | 2/1996 | Schmidt et al. |
| 5,734,242 A | 3/1998 | Iwashita |
| 5,936,369 A | 8/1999 | Iwashita et al. |
| 6,057,661 A * | 5/2000 | Iwashita ............ 318/563 |
| 6,157,156 A | 12/2000 | Tsuruta |
| 6,184,644 B1 * | 2/2001 | Eguchi ............. 318/632 |
| 6,611,125 B2 | 8/2003 | Nagata et al. |
| 6,789,023 B2 | 9/2004 | Tsai et al. |
| 6,920,800 B2 | 7/2005 | Rehm et al. |
| 6,998,812 B2 | 2/2006 | Kerner et al. |
| 7,027,961 B2 | 4/2006 | Molenaar |
| 7,057,366 B1 | 6/2006 | Tsai et al. |
| 2007/0143040 A1 | 6/2007 | Ide |

FOREIGN PATENT DOCUMENTS

| | | |
|---|---|---|
| JP | 09037416 | 7/1997 |
| JP | 2004110190 | 8/2004 |

OTHER PUBLICATIONS

European Search Report; EP 08163190.

* cited by examiner

*Primary Examiner*—Bryan Bui
(74) *Attorney, Agent, or Firm*—Quarles & Brady LLP; Alexander R. Kuszewski

(57) ABSTRACT

A method and apparatus for estimating a system inertia and a load torque in a motor controller, the method comprising the steps of providing an acceleration command signal, determining a motor position, using the motor position to generate an acceleration feedback signal, mathematically combining the acceleration feedback signal and a load torque signal to generate a system inertia estimate, mathematically combining the system inertia estimate and the acceleration command signal to generate a motor torque signal, mathematically combining the system inertia estimate and the acceleration feedback signal to generate an inertia torque and mathematically combining the inertia torque and the motor torque signal to generate the load torque estimate.

17 Claims, 4 Drawing Sheets

INERTIA AND LOAD TORQUE ESTIMATING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers and more specifically to methods and systems for identifying system inertia and load torque disturbances that are needed to properly tune motor controllers.

As well known in the motor control industry, motor/plant inertia identification is an important step in properly tuning a motor drive system. To this end, the way a motor and a linked load (i.e., the plant) respond to control signals (i.e., applied varying voltages) is directly related to motor/plant inertia and therefore, suitable control is directly related to plant inertia. One way to determine plant inertia has been to perform an inertia determining commissioning process prior to normal motor operation and then setting and assuming a constant system inertia value. While these processes work well, they have at least two primary shortcomings.

First, commissioning processes take time to complete and therefore slow the process of setting up a control/drive system. A related issue is that, typically, a skilled engineer or technician is required to properly perform a commissioning procedure and therefore there are costs associated with each additional commissioning step required to set up a drive system.

Second, in at least some applications system inertia changes during system operations. Where inertia changes during operation, the assumed constant value is erroneous and therefore drive control is less than optimal.

One solution in the case of a system where inertia changes during operation is to routinely rerun the inertia estimating commissioning procedure (e.g., once a day). This solution, however, increases the time required to maintain an accurate estimate and does not work well where system inertia fluctuates during the interim periods between recalculation.

BRIEF SUMMARY OF THE INVENTION

It has been recognized that a position feedback signal and a derivable motor torque signal can be used to continually generate a system inertia estimate during normal drive operation and the inertia estimate can then be used to continually tune the drive system. Because the inertia estimate is generated during normal operation there is no need for a separate commissioning procedure. Because the inertia estimate is continually updated the estimate is always accurate and drive control is optimized.

Consistent with the above, at least some inventive embodiments include a method for estimating a system inertia and a load torque in a motor controller, the method comprising the steps of providing an acceleration command signal, determining a motor position, using the motor position to generate an acceleration feedback signal, mathematically combining the acceleration feedback signal and a load torque signal to generate a system inertia estimate, mathematically combining the system inertia estimate and the acceleration command signal to generate a motor torque signal, mathematically combining the system inertia estimate and the acceleration feedback signal to generate an inertia torque and mathematically combining the inertia torque and the motor torque signal to generate the load torque estimate.

In at least some cases the step of providing an acceleration command signal includes providing a velocity command signal, deriving a velocity feedback signal from the motor position and subtracting the motor velocity feedback signal from the velocity command signal. In some cases the step of mathematically combining the acceleration feedback signal and the load torque signal includes filtering the load torque signal to generate a load torque difference signal, multiplying the acceleration feedback signal and the load torque difference signal to generate an inertia product signal and integrating a derivative of the inertia product signal to generate the system inertia estimate.

In some cases the step of mathematically combining the system inertia estimate and the acceleration command signal to generate a motor torque signal includes multiplying a derivative of the system inertia estimate and the acceleration command signal to generate a torque command signal and limiting the torque command signal to generate the motor torque signal. In some embodiments the step of multiplying a derivative of the system inertia estimate and the acceleration command signal includes low pass filtering the system inertia estimate to generate the derivative of the system inertia estimate.

In other cases the step of mathematically combining the system inertia estimate and the acceleration feedback signal to generate an inertia torque includes multiplying the system inertia estimate by the acceleration feedback signal to generate the inertia torque. In some cases the step of mathematically combining the inertia torque and the motor torque signal to generate a load torque estimate includes subtracting the inertia torque from the motor torque signal to generate the load torque estimate. In some cases the step of using the load torque estimate to generate the load torque difference signal includes band pass filtering the load torque estimate.

Other embodiments include a method for deriving a system inertia estimate and a load torque estimate in a motor controller, the method comprising the steps of providing a velocity command signal, sensing a motor position, using the motor position to generate a velocity feedback signal and an acceleration feedback signal, subtracting the velocity feedback signal from the velocity command signal to generate a velocity error signal, using the velocity error signal to generate an acceleration command signal, multiplying the acceleration feedback signal and a load torque difference signal to generate an inertia product signal, using the inertia product signal to generate the system inertia estimate, multiplying the system inertia estimate and the acceleration command signal to generate a motor torque signal, multiplying the acceleration feedback signal and the system inertia estimate to generate an inertia torque, subtracting the inertia torque from the motor torque signal to generate the load torque estimate and filtering the load torque estimate to generate the load torque difference signal.

In some cases the step of using the inertia product signal to generate the system inertia estimate includes scaling the inertia product signal and integrating the scaled product signal to derive the system inertia estimate. In some case the step of filtering the load torque estimate includes band pass filtering the load torque estimate.

Still other embodiments include an apparatus for estimating a system inertia and a load torque in a motor controller, the apparatus comprising a processor programmed to perform the steps of providing an acceleration command signal, determining a motor position, using the motor position to generate an acceleration feedback signal, mathematically combining the acceleration feedback signal and a load torque signal to generate a system inertia estimate, mathematically combining the system inertia estimate and the acceleration command signal to generate a motor torque signal, mathematically combining the system inertia estimate and the acceleration feedback signal to generate an inertia torque and mathematically combining the inertia torque and the motor torque signal to generate the load torque estimate.

In some cases the processor is programmed to perform the step of providing an acceleration command signal by providing a velocity command signal, deriving a velocity feedback signal from the motor position and subtracting the motor velocity feedback signal from the velocity command signal. In some cases the processor is programmed to perform the step of mathematically combining the acceleration feedback signal and the load torque signal by filtering the load torque signal to generate a load torque difference signal, multiplying the acceleration feedback signal and the load torque difference signal to generate an inertia product signal and integrating a derivative of the inertia product signal to generate the system inertia estimate. In some cases the processor is programmed to perform the step of mathematically combining the system inertia estimate and the acceleration command signal to generate a motor torque signal includes multiplying a derivative of the system inertia estimate and the acceleration command signal to generate a torque command signal and limiting the torque command signal to generate the motor torque signal. In some cases the processor is programmed to perform the step of multiplying a derivative of the system inertia estimate and the acceleration command signal by low pass filtering the system inertia estimate to generate the derivative of the system inertia estimate.

In some embodiments the processor is programmed to perform the step of mathematically combining the system inertia estimate and the acceleration feedback signal to generate an inertia torque includes multiplying the system inertia estimate by the acceleration feedback signal to generate the inertia torque. In some other cases the processor is programmed to perform the step of mathematically combining the inertia torque and the motor torque signal to generate a load torque estimate includes subtracting the inertia torque from the motor torque signal to generate the load torque estimate. In some cases the processor is programmed to perform the step of using the load torque estimate to generate the load torque difference signal includes band pass filtering the load torque estimate.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
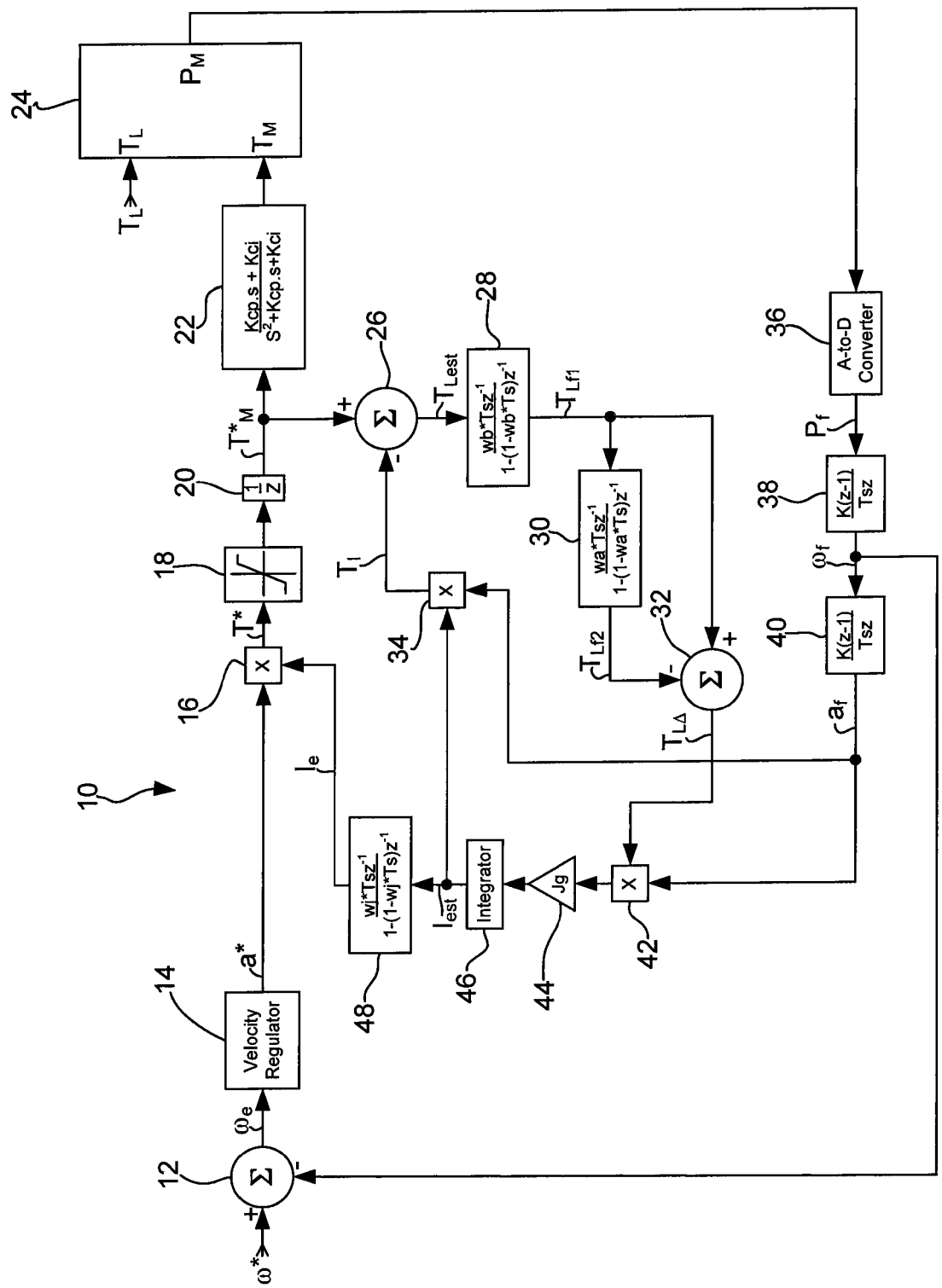
FIG. 1 is a schematic diagram illustrating a drive/plant system that is consistent with at least some aspects of the present invention.

Referring now to the drawings wherein like reference numeral correspond to similar elements throughout the several views and, more specifically, referring to FIG. 1, the present invention will be described in the context of an exemplary controller/plant system 10 that includes first, second and third summers 12, 26 and 32, respectively, a velocity regulator 14, first, second and third multipliers 16, 34 and 42, respectively, a torque/current limiter module 18, a delay module 20, a torque/current regulator 22, an inertia system 24, first, second and third low pass filters 28, 30 and 48, respectively, an integrator module 46, a analog to digital converter 36, a scaling module 44 and first and second derivative modules 38 and 40, respectively.

Referring still to FIG. 1, inputs to system 10 include a velocity command signal $\omega^*$ and a load torque signal $T_L$ where command signal $\omega^*$ is provided by a system user the load torque signal $T_L$ is the torque applied to the system by a load (e.g., items resting on a conveyor belt, a roll of paper being unwound by a motor, etc.). A position sensing device is linked to inertia system 24 to sense position of a motor associated therewith and provide an analog position signal to converter 36. Converter 36, as the label implies, converts the analog position signal to a digital position feedback signal $P_f$ which is provided to first derivative module 38.

First derivative module 38 takes the derivative of the position feedback signal $P_f$ and thereby generates a velocity feedback signal $\omega_f$ which is provided to derivative module 40. Second derivative module 40 take the derivative of the velocity feedback signal $\omega_f$ and thereby generates an acceleration feedback signal $a_f$ which is provided to both multipliers 42 and 34.

Velocity feedback signal $\omega_f$ is provided to summer 12. Summer 12 subtracts the velocity feedback signal $\omega_f$ from the velocity command signal $\omega^*$ to generate a velocity error signal $\omega_e$ which is provided to velocity regulator 14. Velocity regulator 14 uses the velocity error signal $\omega_e$ to generate an acceleration command signal $a^*$ which is provided to multiplier 16.

Multiplier 16 multiplies a filtered system inertia estimate $I_e$ and the acceleration command signal $a^*$ to generate a torque command signal $T^*$ which is provided to the torque/current limiter module 18. Limiter module 18 limits the torque command value $T^*$ to within a predefined range and provides the limited value to delay module 20. As the label implies, delay module 20 delays the limited value and generates a motor torque command signal $T^*_m$. Motor torque command $T^*_m$ is provided to the torque/current regulator 22 which regulates current applied to inertia system 24. System 24 includes a motor and load.

Referring again to FIG. 1, multiplier 42 multiplies the acceleration feedback signal $a_f$ by a filtered load torque difference signal $T_{LA}$ to generate an inertia product signal. Scaler module 44 scales the inertia product signal and provides its output to integrator 46. Integrator 46 integrates the scaled inertia product signal to generate a system inertia estimate $I_{est}$. System inertia estimate $I_{est}$ is provided to multiplier 34 and also to low pass filter 48.

Low pass filter 48 filters out high frequency components of the system inertia estimate $I_{est}$ and provides the filtered inertia estimate to multiplier 16 which is used, along with the acceleration command signal a* to generate the torque command signal T*.

At multiplier 34 the system inertia estimate $I_{est}$ is multiplied by the acceleration feedback signal $a_f$ to generate an inertia torque signal $T_I$. Summer 26 subtracts the inertia torque signal $T_I$ from the motor torque command signal $T^*_m$ to generate a load torque estimate $T_{Lest}$. Load torque estimate $T_{Lest}$ is provided to low pass filter 28 which filters out high frequency components of the value estimate $T_{Lest}$ thereby generating a filtered load torque value $T_{Lf1}$. The filtered load torque value $T_{Lf1}$ is provided to summer 32 and to low pass filter 30. Here, filter 30 has a lower frequency set point than filter 28 and therefore filters out at least a portion of the signal passed by filter 28 corresponding to an upper range of frequencies passed by filter 28. The output of filter 30 is provided to summer 32. Summer 32 subtracts the output $T_{Lf2}$ from filter 30 from the filtered load torque $T_{Lf1}$ thereby generating the filtered load torque difference signal $T_{L\Delta}$ which is provided to multiplier 42.

Figure 2:
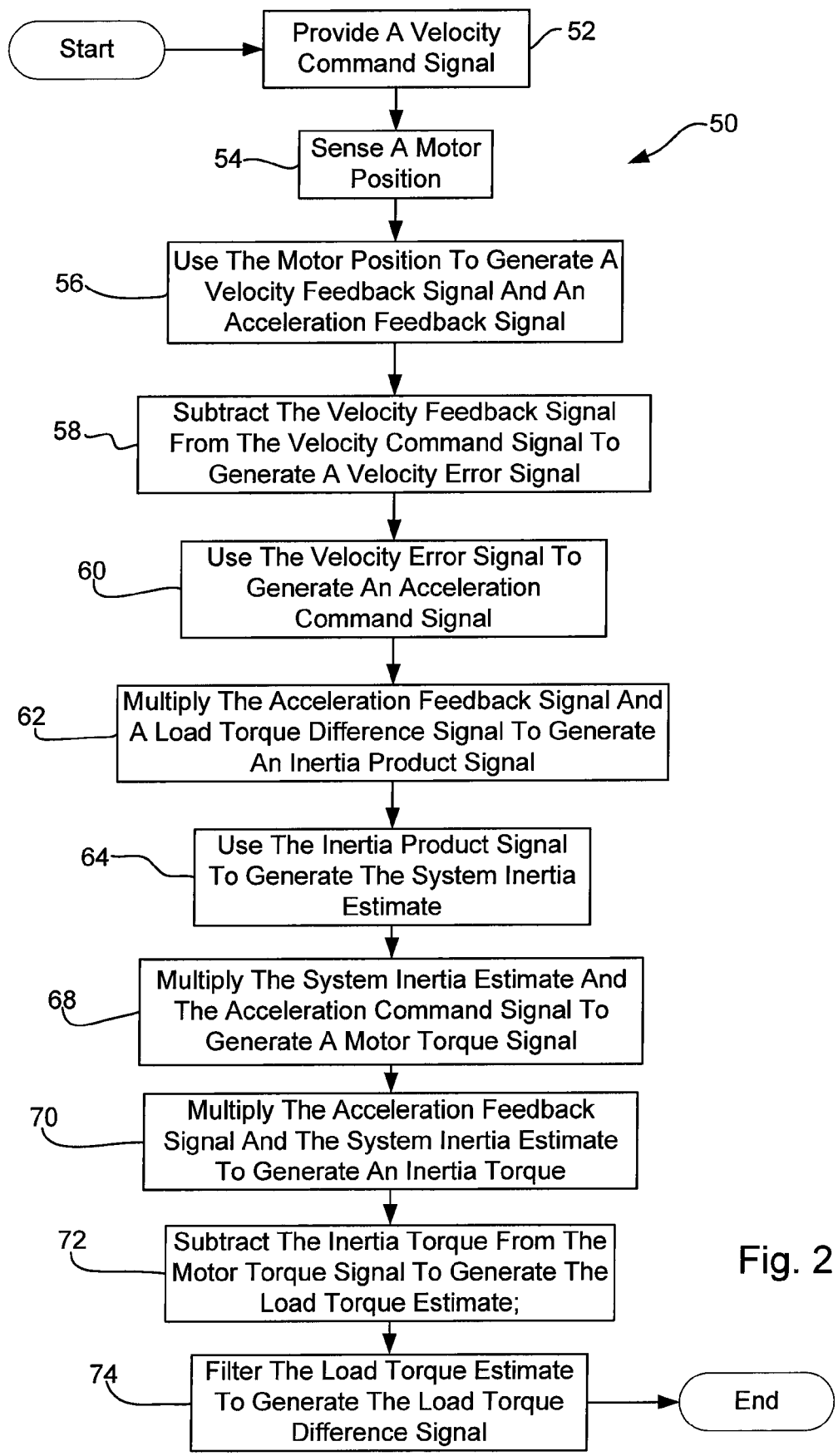
FIG. 2 is a flow chart for estimating system inertia and a load torque that is consistent with at least some aspects of the present invention.

Referring to FIG. 2, an exemplary method 50 that is consistent with at least some aspects of the present invention is illustrated that may be performed by a processor programmed to perform the processes associated with the modules in FIG. 1 described above. To this end, at process block 52, a velocity command signal ω* is provided. At block 54, motor position is sensed and at block 56 the motor position is used to generate a velocity feedback signal and an acceleration feedback signal (see modules 38 and 40 in FIG. 1). At block 58, the velocity feedback signal is subtracted from the velocity command signal to generate a velocity error signal (see summer 12 in FIG. 1). At block 60, the velocity error signal is used to generate an acceleration command signal (see regulator 14 in FIG. 1). At block 62, the acceleration feedback signal and the load torque difference signal are multiplied to generate an inertia product signal (see multiplier 42 in FIG. 1). At block 64, the inertia product signal is scaled up and integrated to generate the inertia estimate signal $I_{est}$ (see 44 and 46 in FIG. 1).

Continuing, referring still to FIG. 2, at block 68, the system inertia estimate and the acceleration command signal are multiplied to generate a motor torque command signal $T^*_m$. At block 70 the acceleration feedback signal is multiplied by the system inertia estimate to generate inertia torque signal $T_I$ (see multiplier 34 in FIG. 1). At block 72, the inertia torque signal is subtracted from the motor torque to generate a load torque estimate (see summer 26 in FIG. 1). At block 74, the load torque estimate $T_{Lest}$ is filtered (see filter modules 28 and 30 in FIG. 1) to generate the load torque difference signal $T_{L\Delta}$.

Figure 3:
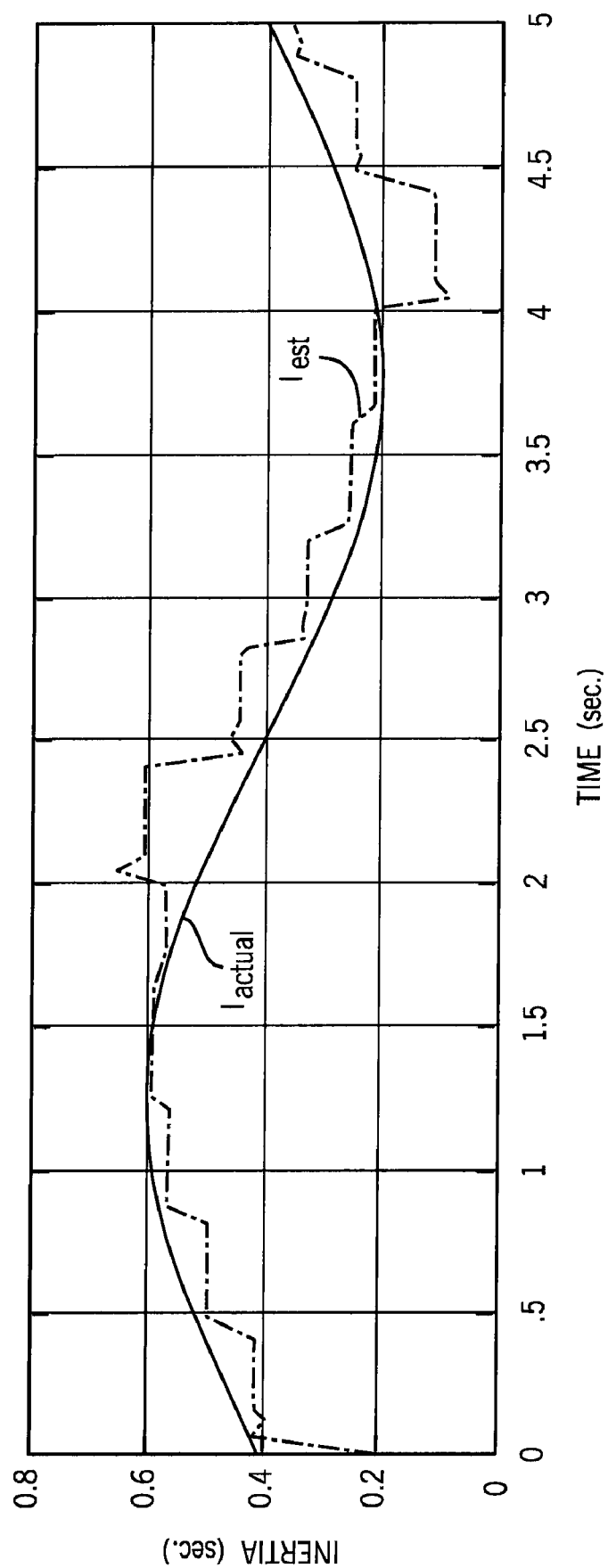
FIG. 3 is a graph illustrating actual and estimated system inertia as a function of time.
Figure 4:
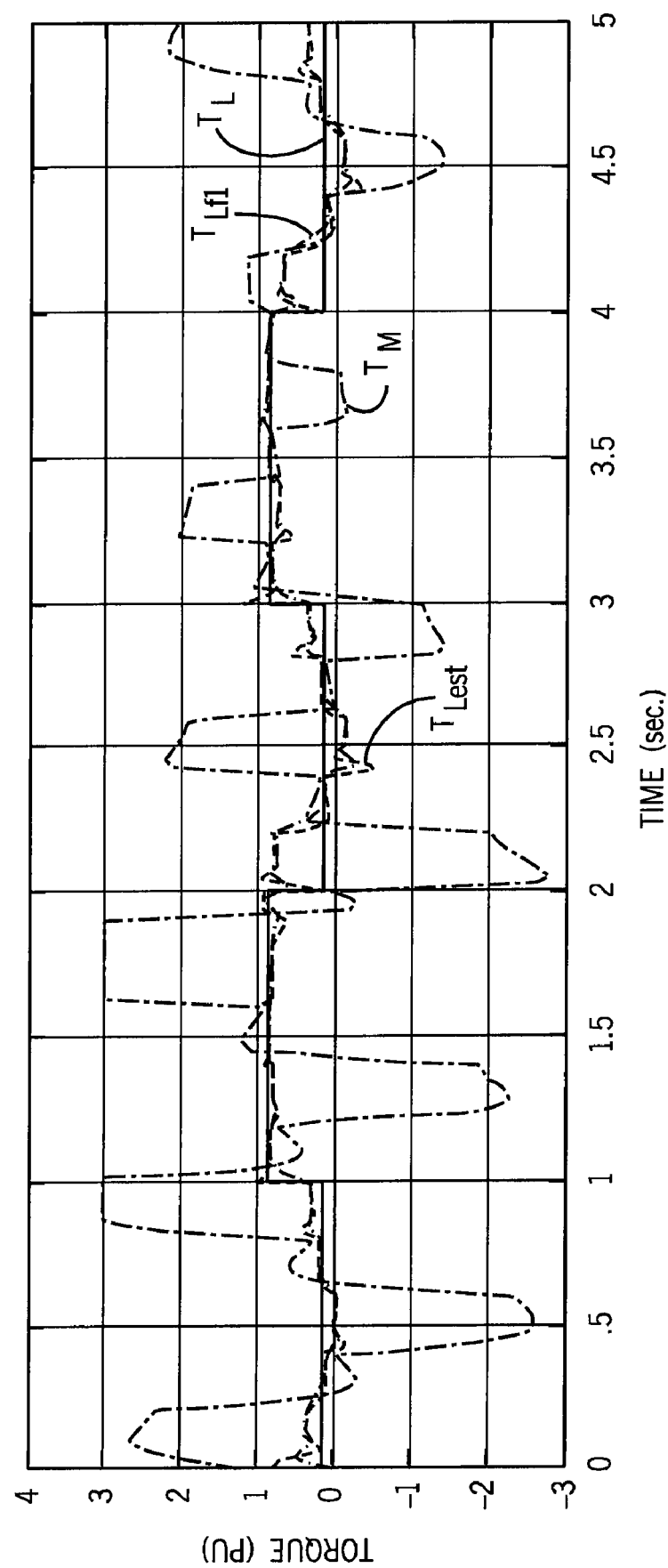
FIG. 4 is a graph illustrating a motor torque, a load torque, a load torque estimate and a filtered load torque estimate derived using the inventive methods.

Referring now to FIG. 3, a graph is provided that includes a smooth sinusoidal system inertia value $I_{actual}$ and a stepped sinusoidal estimated inertia value $I_{est}$ derived using the inventive system. As shown, the inertia estimate generally tracks the actual system inertia. FIG. 4 includes waveforms corresponding to a motor torque $T_M$, a load torque $T_L$ and load torque estimate $T_{Lest}$ and a filtered load torque estimate $T_{Lf1}$ where it can be seen that the load torque estimate $T_{Lest}$ generally tracks the load torque $T_L$ and the filtered estimate even more closely follows the load torque $T_L$. As the inertia and load torque are calculated those values are used to modify drive control.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for estimating a system inertia and a load torque in a motor controller, the method comprising using a motor controller processor to perform the steps of:
   providing an acceleration command signal;
   determining a motor position;
   using the motor position to generate an acceleration feedback signal;
   mathematically combining the acceleration feedback signal and a load torque signal to generate a system inertia estimate;
   mathematically combining the system inertia estimate and the acceleration command signal to generate a motor torque signal;
   mathematically combining the system inertia estimate and the acceleration feedback signal to generate an inertia torque; and
   mathematically combining the inertia torque and the motor torque signal to generate the load torque estimate.

2. The method of claim 1 wherein the step of providing an acceleration command signal includes providing a velocity command signal, deriving a velocity feedback signal from the motor position and subtracting the motor velocity feedback signal from the velocity command signal.

3. The method of claim 1 wherein the step of mathematically combining the acceleration feedback signal and the load torque signal includes filtering the load torque signal to generate a load torque difference signal, multiplying the acceleration feedback signal and the load torque difference signal to generate an inertia product signal and integrating a derivative of the inertia product signal to generate the system inertia estimate.

4. The method of claim 1 wherein the step of mathematically combining the system inertia estimate and the acceleration command signal to generate a motor torque signal includes multiplying a derivative of the system inertia estimate and the acceleration command signal to generate a torque command signal and limiting the torque command signal to generate the motor torque signal.

5. The method of claim 4 wherein the step of multiplying a derivative of the system inertia estimate and the acceleration command signal includes low pass filtering the system inertia estimate to generate the derivative of the system inertia estimate.

6. The method of claim 1 wherein the step of mathematically combining the system inertia estimate and the acceleration feedback signal to generate an inertia torque includes multiplying the system inertia estimate by the acceleration feedback signal to generate the inertia torque.

7. The method of claim 1 wherein the step of mathematically combining the inertia torque and the motor torque signal to generate a load torque estimate includes subtracting the inertia torque from the motor torque signal to generate the load torque estimate.

8. A method for deriving a system inertia estimate and a load torque estimate in a motor controller, the method comprising using a motor controller processor to perform the steps of:
providing a velocity command signal;
sensing a motor position;
using the motor position to generate a velocity feedback signal and an acceleration feedback signal;
subtracting the velocity feedback signal from the velocity command signal to generate a velocity error signal;
using the velocity error signal to generate an acceleration command signal;
multiplying the acceleration feedback signal and a load torque difference signal to generate an inertia product signal;
using the inertia product signal to generate the system inertia estimate;
multiplying the system inertia estimate and the acceleration command signal to generate a motor torque signal;
multiplying the acceleration feedback signal and the system inertia estimate to generate an inertia torque;
subtracting the inertia torque from the motor torque signal to generate the load torque estimate; and
filtering the load torque estimate to generate the load torque difference signal.

9. The method of claim 8 wherein the step of using the inertia product signal to generate the system inertia estimate includes scaling the inertia product signal and integrating the scaled product signal to derive the system inertia estimate.

10. The method of claim 8 wherein the step of filtering the load torque estimate includes band pass filtering the load torque estimate.

11. An apparatus for estimating a system inertia and a load torque in a motor controller, the apparatus comprising:
a sensing device for determining a motor position;
at least a first derivative module using the motor position to generate an acceleration feedback signal;
a module for mathematically combining the acceleration feedback signal and a load torque signal to generate a system inertia estimate;
a module for mathematically combining the system inertia estimate and an acceleration command signal to generate a motor torque signal;
a module for mathematically combining the system inertia estimate and the acceleration feedback signal to generate an inertia torque; and
a module for mathematically combining the inertia torque and the motor torque signal to generate the load torque estimate.

12. The apparatus of claim 11 further including a second derivative module for deriving a velocity feedback signal from the motor position, a summer for subtracting the motor velocity feedback signal from a velocity command signal to generate the acceleration command signal.

13. The apparatus of claim 11 wherein the module for mathematically combining the acceleration feedback signal and the load torque signal includes a filter for by filtering the load torque signal to generate a load torque difference signal, a multiplier for multiplying the acceleration feedback signal and the load torque difference signal to generate an inertia product signal and an integrator for integrating a derivative of the inertia product signal to generate the system inertia estimate.

14. The apparatus of claim 11 wherein the module for mathematically combining the system inertia estimate and the acceleration command signal to generate a motor torque signal includes a multiplier for multiplying a derivative of the system inertia estimate and the acceleration command signal to generate a torque command signal and a limiter for limiting the torque command signal to generate the motor torque signal.

15. The apparatus of claim 14 wherein the multiplier multiplies the derivative of the system inertia estimate and the acceleration command signal by low pass filtering the system inertia estimate to generate the derivative of the system inertia estimate.

16. The apparatus of claim 11 wherein the module for mathematically combining the system inertia estimate and the acceleration feedback signal to generate an inertia torque includes a multiplier for multiplying the system inertia estimate by the acceleration feedback signal to generate the inertia torque.

17. The apparatus of claim 11 wherein the module for mathematically combining the inertia torque and the motor torque signal to generate a lead torque estimate includes a summer for subtracting the inertia torque from the motor torque signal to generate the load torque estimate.

* * * * *